(12) United States Patent
Chiavassa et al.

(10) Patent No.: US 12,540,094 B2
(45) Date of Patent: Feb. 3, 2026

(54) CONFIGURABLE GOB GUIDING UNIT PROVIDED WITH DEFLECTORS FOR A GLASS ARTICLES FORMING SECTION

(71) Applicant: BOTTERO S.P.A., Cuneo (IT)

(72) Inventors: Danilo Chiavassa, Cuneo (IT); Marcello Ostorero, Cuneo (IT); Ivan Giaccone, Cuneo (IT); Paolo Cavallera, Cuneo (IT); Marco Tecchio, Cuneo (IT)

(73) Assignee: BOTTERO S.P.A., Cuneo (IT)

( * ) Notice: Subject to any disclaimer, the term of this patent is extended or adjusted under 35 U.S.C. 154(b) by 171 days.

(21) Appl. No.: 18/478,010

(22) Filed: Sep. 29, 2023

(65) Prior Publication Data

US 2024/0109801 A1 Apr. 4, 2024

(30) Foreign Application Priority Data

Sep. 29, 2022 (IT) .................. 102022000020073

(51) Int. Cl.
*C03B 7/16* (2006.01)
(52) U.S. Cl.
CPC .................... *C03B 7/16* (2013.01)
(58) Field of Classification Search
None
See application file for complete search history.

(56) References Cited

U.S. PATENT DOCUMENTS

| | | | | |
|---|---|---|---|---|
| 4,417,915 A | * | 11/1983 | Dahms | C03B 35/125 65/159 |
| 5,599,370 A | * | 2/1997 | Struckmeier | C03B 7/16 65/304 |
| 5,935,287 A | | 8/1999 | Graefe et al. | |
| 6,038,888 A | * | 3/2000 | Flynn | C03B 7/16 65/304 |

FOREIGN PATENT DOCUMENTS

| | | | |
|---|---|---|---|
| EP | 0693460 A2 | 1/1996 | |
| EP | 0930275 A1 | * 7/1999 | C03B 7/16 |

OTHER PUBLICATIONS

Italian Search Report dated May 15, 2023 from Italian Patent Application No. 202200020073, 7 pages.

* cited by examiner

*Primary Examiner* — Queenie S Dehghan
(74) *Attorney, Agent, or Firm* — Ruggiero McAllister & McMahon LLC

(57) ABSTRACT

In a section for forming glass articles, provided with a forming mould, the glass gobs are fed into the cavities of the forming mould via a configurable gob guiding unit. The gob guiding unit has a support structure designed for a maximum number of cavities that can be used on the section. For each cavity of the forming mould, there is a respective deflector that has a curved portion delimiting a curved channel for guiding the gobs into the cavities and two arms. The two arms extend in a cantilevered manner from the curved portion. The two arms have respective attachment portions (Continued)

for connecting to the support structure and each has a respective adaptation portion designed on the basis on the position of the cavity.

9 Claims, 10 Drawing Sheets

CONFIGURABLE GOB GUIDING UNIT PROVIDED WITH DEFLECTORS FOR A GLASS ARTICLES FORMING SECTION

CROSS-REFERENCE TO RELATED APPLICATIONS

This application claims priority from Italian patent application no. 102022000020073 filed on Sep. 29, 2022, the entire disclosure of which is incorporated herein by reference.

BACKGROUND OF THE DISCLOSURE

1. Field of the Disclosure

This disclosure relates to a configurable gob guiding unit provided with deflectors, for a glass articles forming section in a glass article forming machine.

2. Background of the Disclosure

In the field of forming glass articles, it is known to use forming machines commonly known as IS machines.

An IS machine comprises multiple forming sections arranged side by side so that each produces an ordered succession of products.

Each forming section comprises its own blank mould provided with a row of cavities, that are open upwards and are arranged side by side and specularly in relation to a reference vertical axis, defining a reference for the positioning of the mould on the section.

The mould cavities are designed to receive, each, a succession of melted glass gobs, which are directed inside the cavities by a dedicated gob guiding unit, that is placed overhead and receives, in turn, the gobs from a gob forming and distribution unit, common to all the forming sections.

Each gob guiding unit comprises, starting from the forming and distribution unit and in a forward direction of advancement of the gobs, and for each of the cavities, an advancement inclined channel and a deflector, which delimits a curved guide channel, receiving the gobs from the advancement inclined channel and directs them inside the corresponding mould cavity.

Each deflector is manufactured as a single piece, for example by casting and mechanical processing, and comprises a curved portion delimiting the guide channel, and a pair of attachment arms, integral with the curved portion and projecting in a cantilevered manner from the same curved portion.

Each attachment arm comprises an attachment end portion, generally in the shape of an eyelet, releasably coupled to a corresponding vertical pin of an adaptable support structure, which is supported by a fixed frame of the machine and is modified every time the number of cavities and, thus, the number of deflectors is changed. In each deflector, the curved channel is sized based on the dimensions of the gobs to be transferred, while the attachment arms are sized so that the channel outlet directly conveys the gobs into the corresponding cavity.

When the production change of the forming section involves the replacement of the mould with another mould that has a different number of cavities and, for example, a change from four cavities to three cavities, all four deflectors present on the section are disassembled and replaced with three deflectors that are geometrically different and are configured to guide the gobs into the new cavities.

Since the three new cavities are arranged at different distances from the above-mentioned reference vertical axis, if compared to the distances of the preceding four cavities in relation to the same reference vertical axis, the attachment position of the deflectors to the attachment structure must be changed.

The change in the attachment position is made possible by the structure supporting the deflectors, which is a modular and configurable structure. In other words, in this structure, on a case-by-case basis, some parts are repositioned or removed and replaced with other parts that are geometrically and/or dimensionally different from the previous ones. In this way, the support structure is, in practice and on a case-by-case basis, adapted or configured based on the number of cavities of the installed new mould.

Although universally used, the reconfiguration mode of the support structure, as a result of the changes in the number of cavities of the used mould, is not very satisfying for the following reasons.

First of all, at every mould change, the parts of the support structure must be disassembled and moved away from the machine, and all the parts necessary for the change in the support structure must be carried onto the section. This goes for each of the machine sections.

The support structure must be modified solely by specialised workers, trained and equipped to safely operate on the section, where the handling spaces are extremely limited, because the same support structure is surrounded by various other components of the machine, and because the working zone is not comfortable. The operators must, in fact, work practically inside the machine, standing on their feet on crossbars or supports arranged at the level of the moulds but, above all, in an adverse environment, due to the presence of residues from lubricating products and powders generated by the previous production.

This situation entails long intervention times, normally a couple of hours for all the sections, which equates to approximately half the total time necessary for changing moulds and the complete reconfiguration of the whole section.

The reconfiguration of the support structure thus entails large costs for specialised labour and replacement parts, in combination, however, with much more significant costs deriving from the lost production of the section, that, on average, is in the range of five thousand Euros for every hour of machine stoppage.

A change into support structures already configured outside the machine is not possible, since it would, in any case, require the removal of a large number of devices and parts that surround the same support structure and would entail the extraction of the same from above: this extraction, however, is impracticable, since it is not possible to mount a hoist above the sections, due to the extremely limited space.

In addition to this, all the deflector maintenance operations, either the extraordinary ones, needed as a result of unexpected wear of the guide channels, or the ordinary ones, for restoring the sliding surface for the glass gobs, entail the replacement of the whole deflector so that the machine user must have at least two complete sets of deflectors for each mould in the warehouse, but these deflectors, due to their shape, are relatively bulky.

Besides, in the warehouse, the same user must have the complete set of deflectors for each mould that they intend to use, even in the case in which the guide channel is the same for two or more moulds.

U.S. Pat. No. 5,935,287A shows a solution wherein the curved portions of the deflectors are releasably connected to the corresponding attachment arms, via screws, so that they can be detached.

EP0693460A2 relates to another kind of adjustable attachment system.

The purpose of this disclosure is to provide a configurable gob guiding unit provided with deflectors, to guide glass gobs inside the cavities of a glass forming mould, which makes it possible to simply and economically resolve the problems outlined above.

A particular purpose of this disclosure is to provide a configurable gob guiding unit that makes it possible to drastically reduce the deflector replacement times and, in general, the machine stoppage time.

Another purpose of this disclosure is to provide a configurable gob guiding unit that makes it possible to simplify the support structure of the deflectors and reduce the time that the operator stays on the machine.

SUMMARY OF THE DISCLOSURE

The purpose of this disclosure is to provide a configurable gob guiding unit provided with deflectors, to guide glass gobs inside the cavities of a forming mould in a glass articles forming section.

In the deflectors of the configurable gob guiding unit defined above, the adaptation portion is preferably a portion that can be detached from the curved portion.

A configurable gob guiding unit for a glass article forming section having a forming mould with one or more cavities is provided. Each of the one or more cavities is suitable to accommodate a respective glass gob. The configurable gob guiding unit has, for each of the one or more cavities, a respective deflector and a support structure connectable to a frame of the configurable gob guiding unit, the support structure having an attachment for the respective deflector. Each respective deflector has a curved portion delimiting a curved channel for guiding the respective glass gob into a respective one of the one or more cavities and two arms extending in a cantilevered manner from the curved portion. Each of the two arms has a respective attachment portion. Each of the two arms has an adaptation portion configured based on a position of a corresponding cavity to allow coupling of the respective attachment portion to the support structure via the attachment. The structure has a set number of attachments equal to a maximum number of deflectors that can be mounted in the section or a maximum number of cavities that can be used in the glass article forming section regardless of the actual number of deflectors and cavities that are mounted in the glass article forming section during use. The configurable gob guiding unit has at least one functional configuration in which at least one attachment is unused.

Each of the two arms can have an attachment end element carrying the respective attachment portion and comprising the adaptation portion and a releasable connection interposed between the curved portion and the attachment end element. The adaptation portion can be configured based on a number of cavities of the forming mould or the position of the corresponding cavity in the forming mould.

The adaptation portion can be detachable from the curved portion.

Each of the two arms comprises can have a bracket fixedly connected to the curved portion, an attachment end element carrying the respective attachment portion and comprising the adaptation portion, and a releasable connection interposed between the bracket and the attachment end element to allow disassembly of the attachment end element from the bracket.

The releasable connection can include clamping screws.

The attachment end element can be a base that joins to the bracket by the releasable connection and a stem interposed between the base and the respective attachment portion that defines the adaptation portion.

Each attachment end element can be interchangeable with at least one further attachment end element having the same base, the same attachment portion, and a further stem that is geometrically and/or dimensionally different from the stem of the attachment end element.

The attachment can include a pin for each of the two arms.

Each pin can have a position that remains unchanged when the configurable gob guiding unit is in different functional configurations.

A configurable forming section for producing glass articles includes the configurable gob guiding unit according to the disclosure.

BRIEF DESCRIPTION OF THE DRAWINGS

The disclosure will now be described with reference to the accompanying drawings, illustrating a non-limiting example.

DETAILED DESCRIPTION OF THE DISCLOSURE

Figure 1:
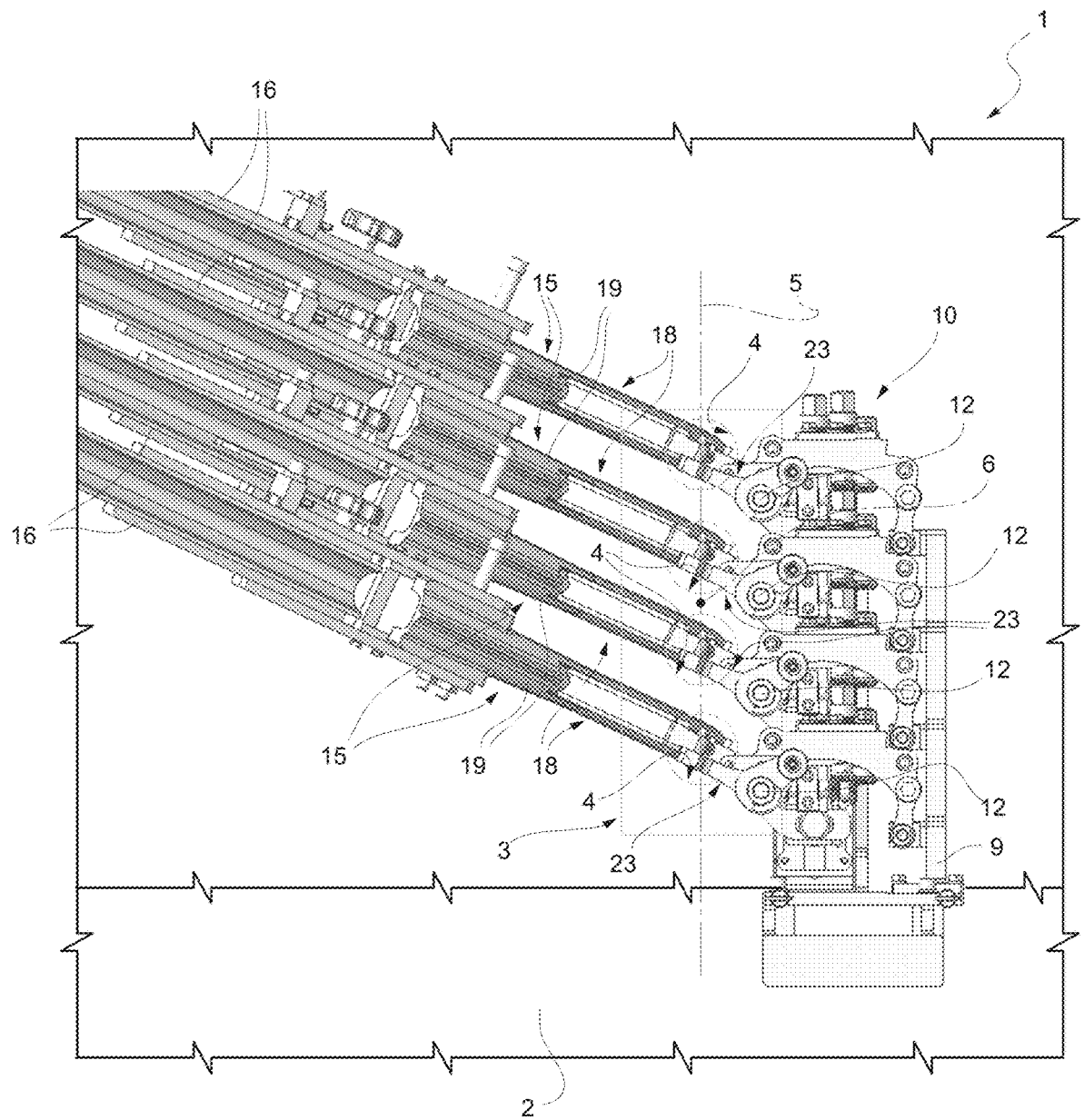
FIG. 1 illustrates, schematically in plan and with parts removed for clarity, a forming section provided with a forming mould and a gob guiding unit that has configurable deflectors for inserting glass gobs in the mould, according to the teachings of this disclosure.
Figure 2:
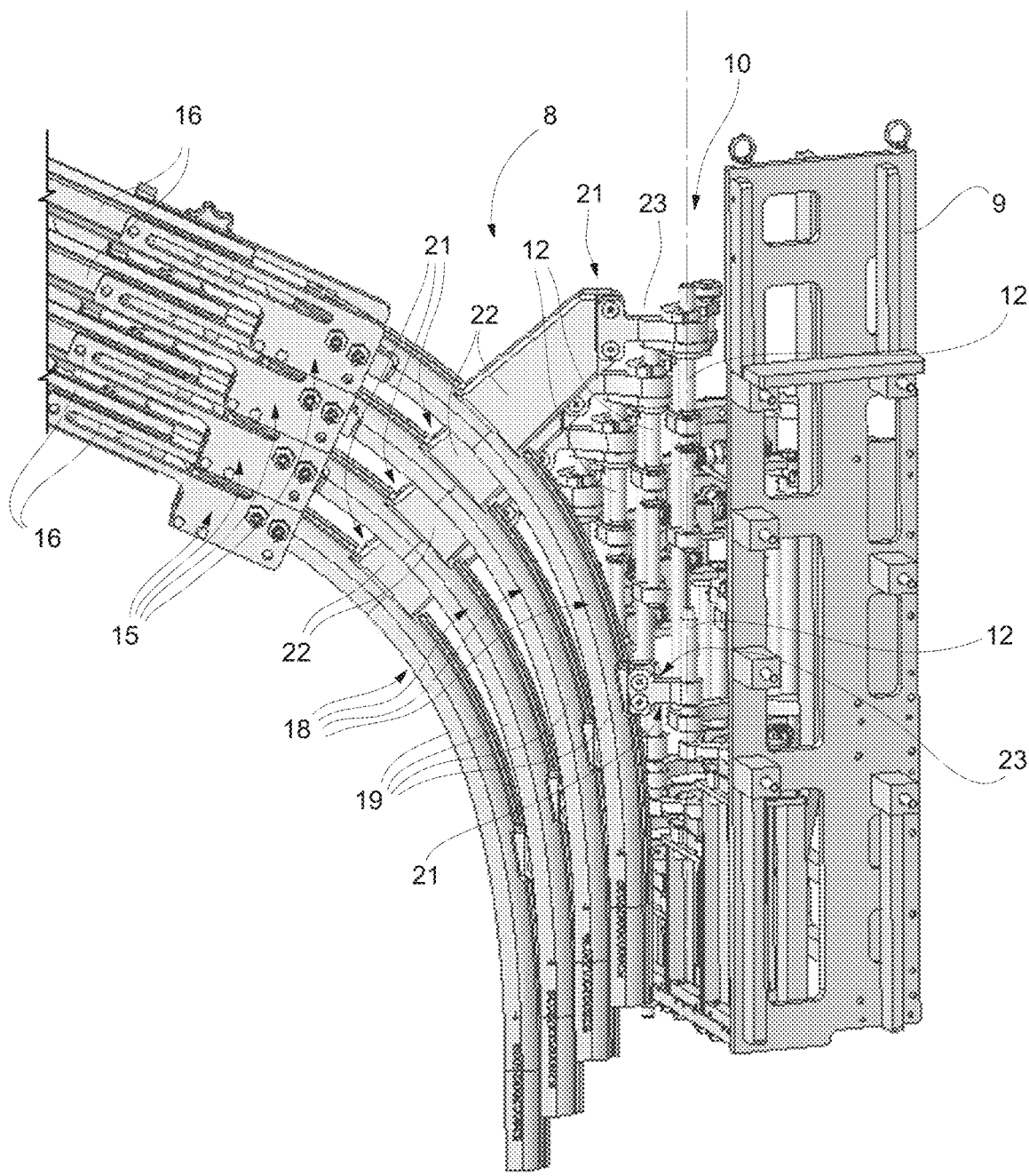
FIG. 2 is a perspective side view of the gob guiding unit in FIG. 1.

In FIGS. 1 and 2, reference number 1 indicates, as a whole, a glass articles forming section for a glass article forming machine, universally known as an IS machine.

The forming section 1 comprises a base 2, which supports, in a known way, a forming mould 3, which is also known and not described in detail, that has cavities 4 open upwards and designed to receive, each one, a corresponding glass gob.

In the example illustrated in FIGS. 1 and 2, the mould 3 comprises four cavities 4 aligned with each other in a direction 5 and arranged symmetrically in relation to a reference vertical axis: the outline of this axis is indicated by reference number 6 in FIG. 1.

The section 1 also comprises a gob guiding unit 8 arranged higher than the mould 3 to convey the gobs coming from a gob distributor, known and not shown in the attached figures, into the cavities 4.

The gob guiding unit 8 is a guiding unit that can be configured based on the features of the mould 3 and, in particular, based on the features of the cavities 4, the number of these cavities 4 of the mould 3 itself, and/or of their arrangement in relation to the reference vertical axis 6, as will be clear from what is described below.

Again with reference to FIGS. 1 and 2, the gob guiding unit 8 comprises a frame 9 that is fixed in relation to the base 2 and a support and adjustment structure 10, which is carried by the frame 9, is built for a maximum number of cavities 4 that can be provided on the section 1, four in this case, and is used as such when the number of cavities 4 is less than the maximum number.

For each of the cavities 4, equal to the above-mentioned maximum number, the structure 10 comprises two vertical attachment pins 12 that are vertically spaced apart and arranged along a common vertical axis, as can be seen in FIG. 1. The gob guiding unit 8 comprises, in addition, for each cavity 4, a respective gob guide device 15, in turn comprising, starting from the gob distributor and in the advancement direction of the gobs towards the mould 3, a straight hollow body 16 defining a downwardly inclined straight channel and a deflector 18 to direct the glass gobs inside the corresponding cavity 4.

Figure 3:
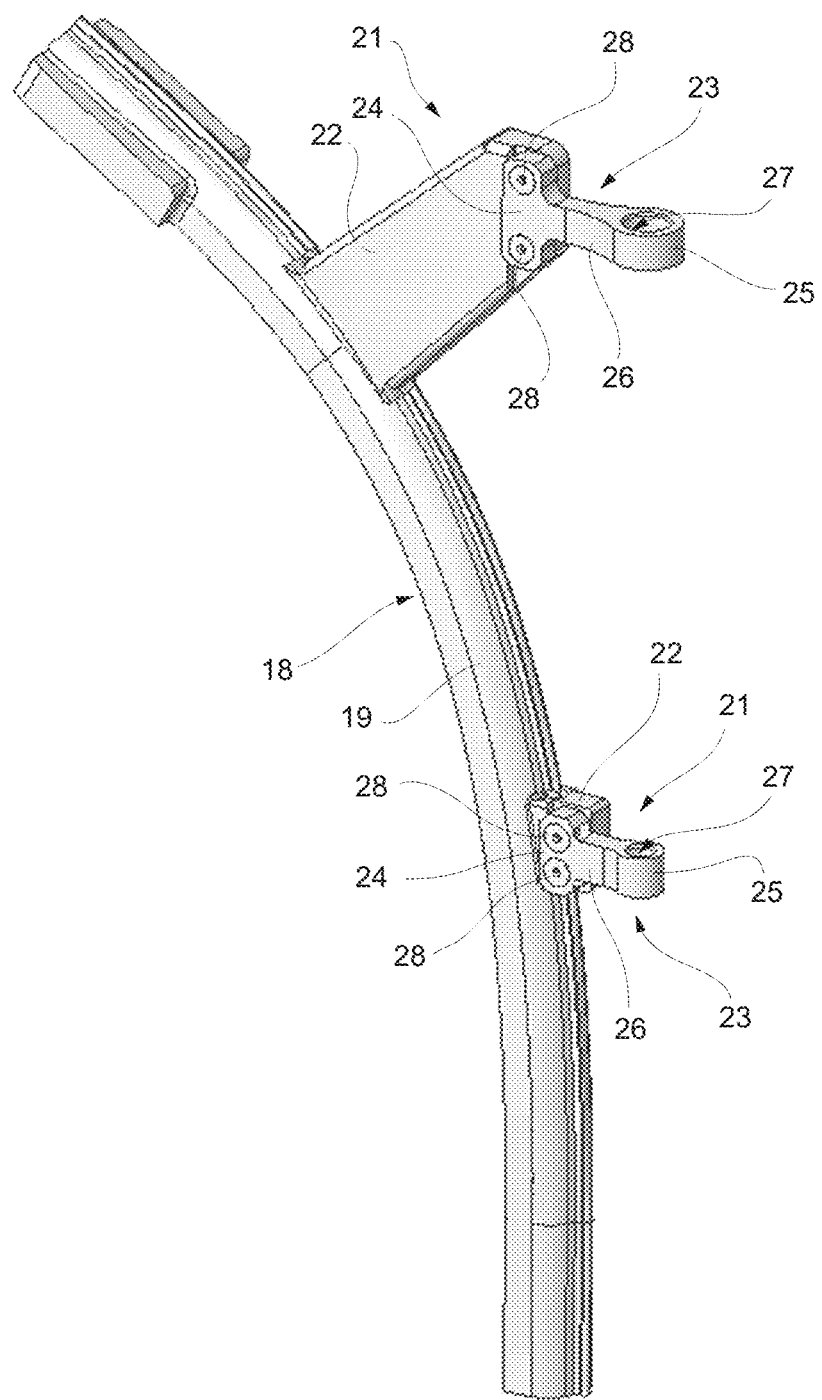
FIG. 3 is a highly enlarged perspective view of a detail in FIG. 2.
Figure 4:
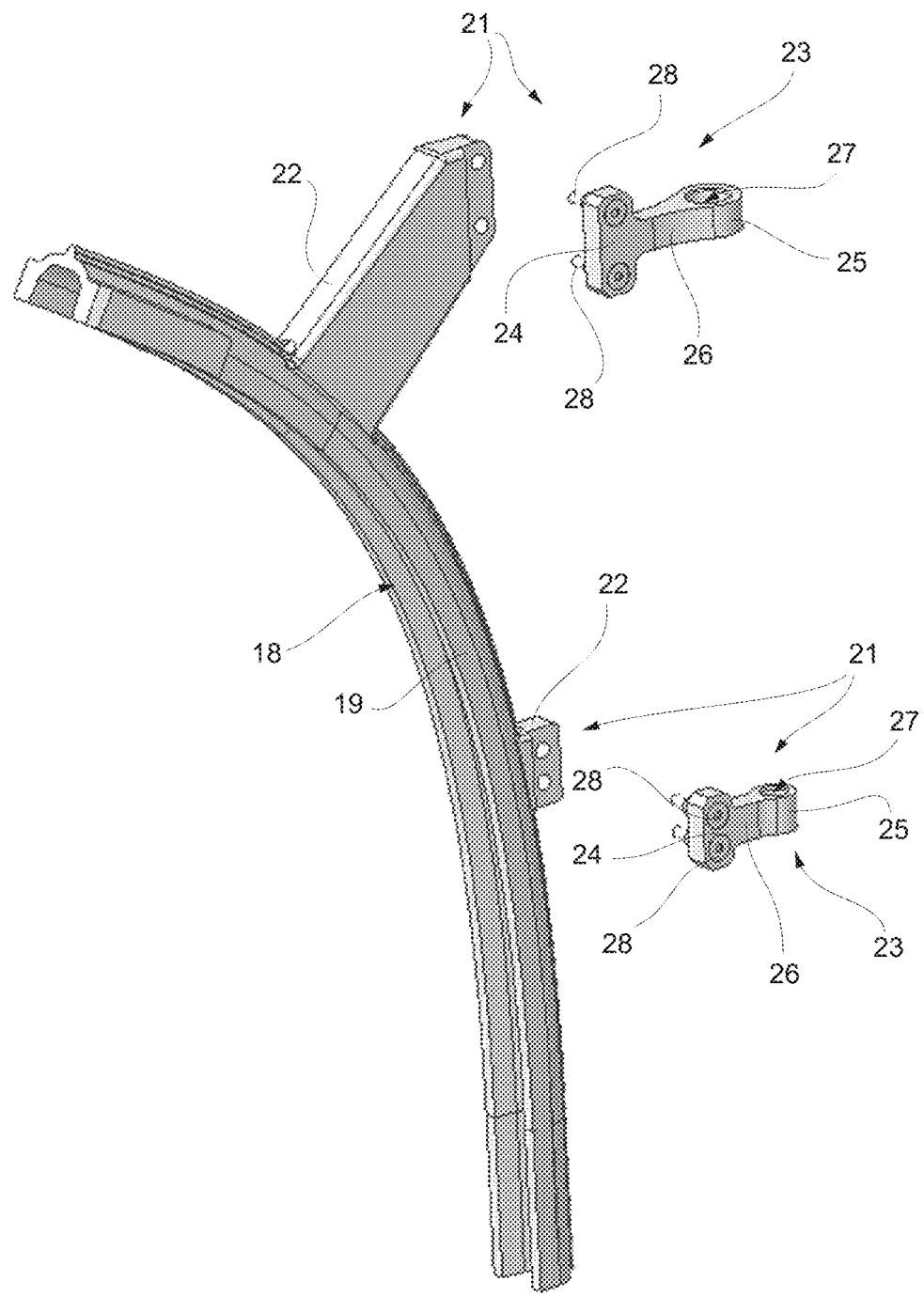
FIG. 4 is an exploded perspective view of the detail in FIG. 3.

With reference to FIG. 2 and, in particular, to FIGS. 3 and 4, each deflector 18 comprises a curved portion 19 delimiting a curved channel 20 (FIG. 4) configured to receive, at the inlet, gobs from the corresponding straight channel 16 and to direct, at the outlet, the gobs into the corresponding cavity 4.

With reference to FIG. 2 and, in particular to FIGS. 3 and 4, each deflector 18 also comprises a pair of arms 21 for attaching the related curved portion 19 to the corresponding pins 12 of the structure 10.

With reference to FIGS. 3 and 4, the two arms 21 of each deflector 18 are vertically spaced apart from each other, extend in a cantilevered manner from the curved portion 19, and, preferably, are arms that can be disassembled or, at least, in part detached from the corresponding curved portion 19.

With reference to FIGS. 2, 3, and 4, each arm 21 comprises a respective bracket 22 permanently connected to the curved portion 19 and a respective attachment end element 23, removably coupled to the corresponding bracket 22, on one side, and to the corresponding pin 12, on the other side.

In particular, each attachment end element 23 comprises its own joining base 24 for joining to the corresponding bracket 22, an attachment portion or attachment end portion 25 for connecting to the corresponding pin 12, and a stem 26 interposed between the joining base 24 and the attachment portion or attachment end portion 25.

Conveniently, the attachment portion or attachment end portion 25 delimits a through hole 27, with a vertical axis, engaged by the corresponding pin 12.

Conveniently, in addition, each joining base 24 is releasably connected to the corresponding bracket 22, for example, via one or more clamping screws 28, as can be seen in FIGS. 3 and 4.

In this way, each curved portion 19 can easily be disconnected from the corresponding attachment end elements 23, leaving, or not, the same attachment end elements 23 coupled to the corresponding pins 12, to be quickly replaced with a new curved portion 19, for example when worn or requiring operations to recover the original conditions of its curved channel 20.

Similarly, only the curved portion 19 is easily disconnected from the corresponding attachment end element 23 and quickly replaced with a different curved portion that has, for example, a different curved channel 20, in the production changes that involve a new mould that has the same number of cavities as the preceding mould, but cavities with a different shape or size, again compared to the previous ones.

Figure 5:
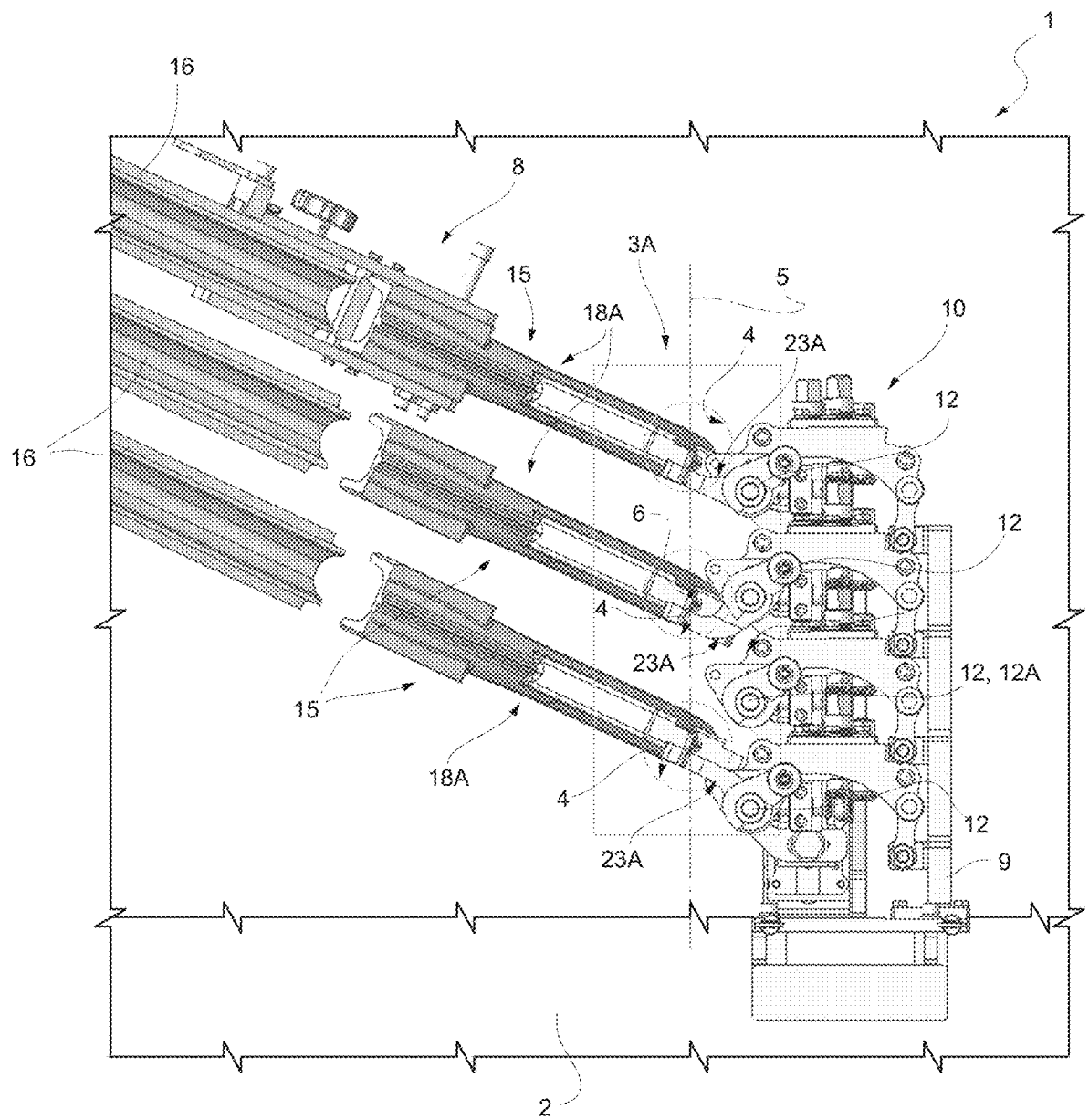
FIG. 5 is a similar figure to FIG. 1 and illustrates the gob guiding unit modified to feed glass gobs into a forming mould that has a lower number of cavities than that of the mould in FIG. 1.
Figure 6:
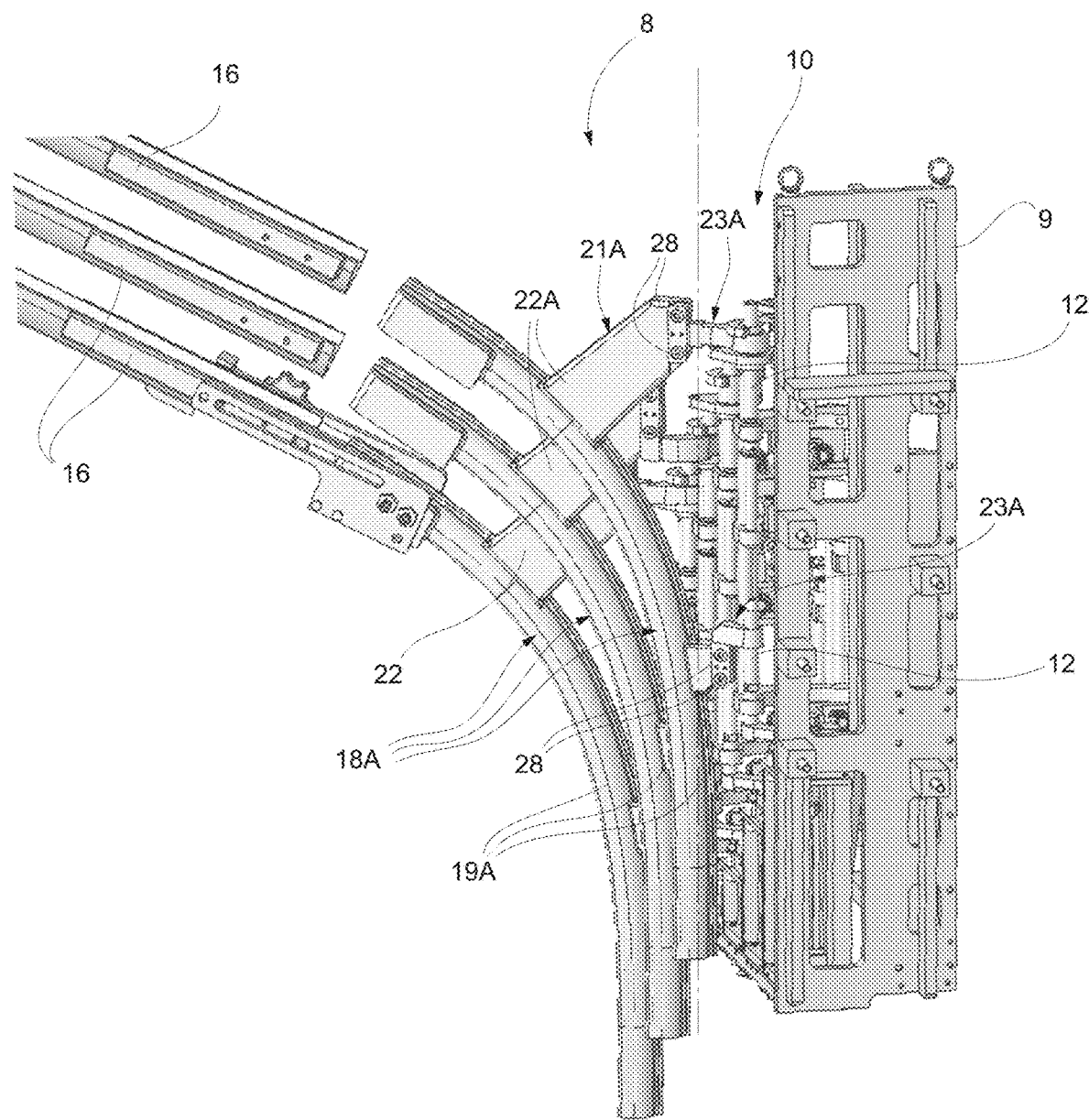
FIG. 6 illustrates, in side elevation, the gob guiding unit in FIG. 5.

FIGS. 5 and 6 illustrate the section 1 reconfigured for a different production, which involves the use of a mould 3A, to replace the mould 3, and deflectors 18A to replace the deflectors 18.

The mould 3A has three cavities 4A, including a central one that is arranged coaxially in relation to the reference vertical axis 6, and the two side cavities 4A are arranged symmetrically and on opposite sides of the same reference vertical axis 6, and at the same distance from the reference vertical axis 6, measured along the direction 5.

The deflectors 18A are conceptually the same as the deflectors 18 and each comprise a curved portion 19A, which is configured to guide the gobs into the corresponding cavity 4A and is connected to the structure 10 via arms 21A, that are conceptually identical to the arms 21 and comprise, each, a respective bracket 22A and a respective attachment end element 23A.

Figure 7:
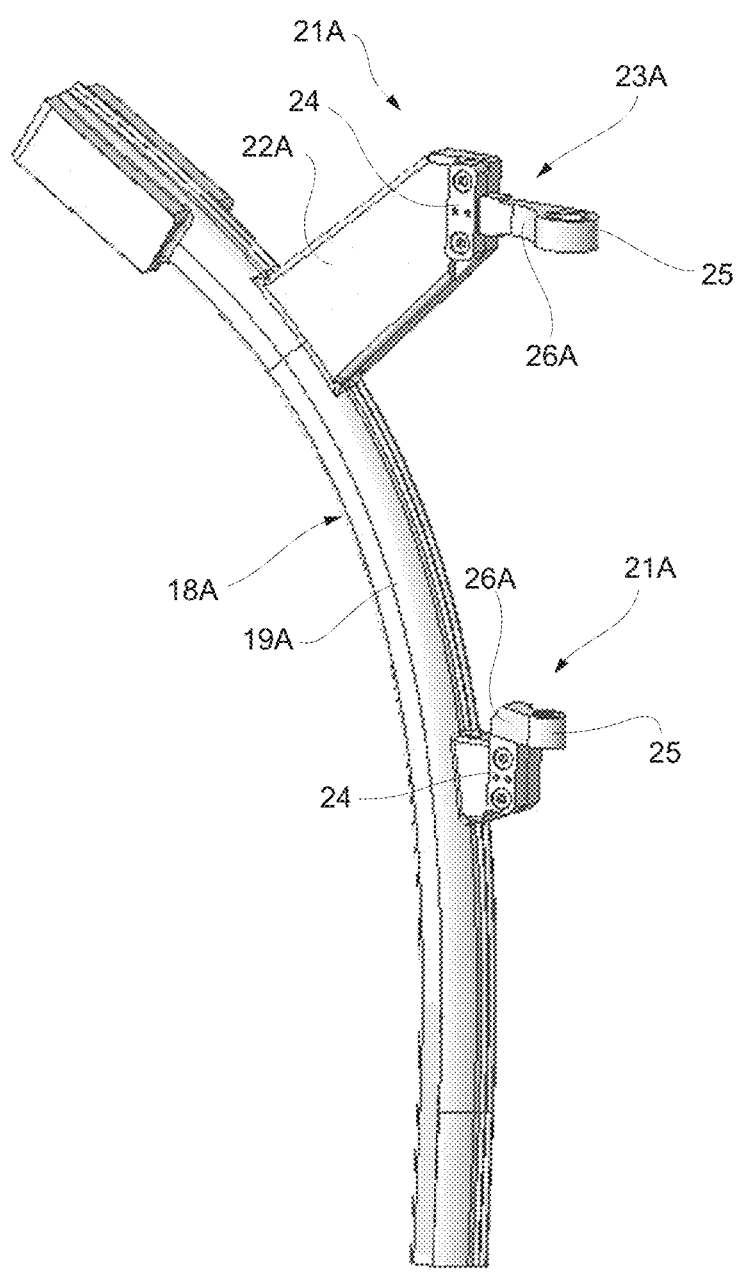
FIG. 7 is a highly enlarged perspective view of a detail in FIG. 6.
Figure 8:
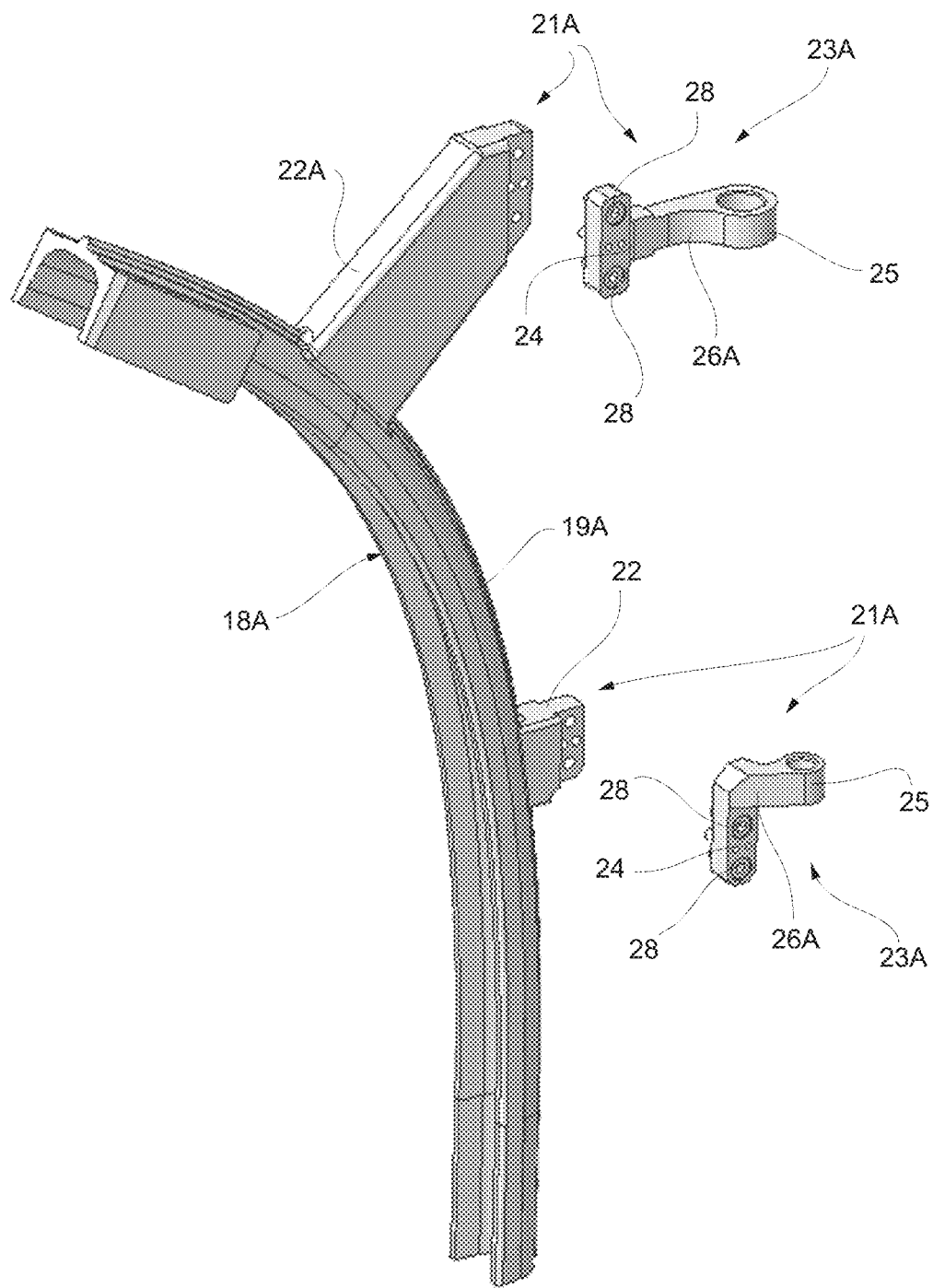
FIG. 8 is an exploded perspective view of the detail in FIG. 7.

The attachment end elements 23A that can be seen in FIGS. 5 and 6 and, more specifically, in FIGS. 7 and 8, differ from the attachment end elements 23 solely due to the fact of having a stem 26A that is different from the stems 26 in terms of geometry and/or size.

As can immediately be seen in a comparison between FIGS. 1 and 5, the distances between the cavities 4, 4A, like the distance of each of the cavities 4, 4A from the reference vertical axis 6, are different from each other, while the position of the pins 12 remains unchanged in the two configurations. In the configuration in FIG. 5, one pair of attachment pins, indicated with 12A, obviously remains unused.

According to the present disclosure, the above-mentioned differences in distance of the cavities 4, 4A from the reference vertical axis 6 are simply compensated for by the different geometry/size of the stems 26A of the attachment end elements 23A that, in practice, define an adaptation portion of the arms and this makes it possible to maintain the structure 10 unchanged, independently from the number of cavities 4, 4A provided on the section 1 and, in general, independently from each reconfiguration of the section 1 to manufacture a different glass article.

As a result, in relation to known solutions, on the one hand, the structure 10 is enormously simplified and never modified when production changes occur and, on the other hand, the reconfiguration operations for the section 1 carried out on the machine are drastically reduced.

This is due to the presence of attachment end elements 23, 23A, and, basically, of the stems 26, 26A, which are designed beforehand depending on the number of cavities of the mould mounted on the section and/or depending on the position of each cavity in relation to the reference vertical axis 6. They make it possible to carry out configuration operations for the gob guiding unit outside the machine, while these operations, in the known solutions, were done on the machine.

Furthermore, the use of attachment end elements that are separated from the corresponding curved portions 19 and releasably coupled to the same curved portions 19 enables, first, an easy replacement of the curved portions delimiting the curved channels for the ordinary maintenance of the same curved channels and, secondly, the reconfiguration of the section in extremely short times and in a particularly easy way at each production change, in particular when the new production involves the use of a mould that has a lower number of cavities than the maximum number of cavities 4.

From the above, the advantages for the user appear clear when the section is reconfigured: in fact, the user, at the same time as using the section, can prepare the new deflectors for the production change and, once the previous production is finished, can disengage the deflectors 18 from the machine and immediately engage the new, prepared deflectors, with an enormous saving in time and in terms of labour but, above all, drastically reducing the machine stoppage.

In addition to this, in relation to the known configurations modes, the reconfiguration operators work only for a very short time on the machine (in uncomfortable conditions), since the reconfiguration of the deflectors is carried out completely outside the forming section and without, in any way, needing to modify the structure 10 that supports the deflectors, i.e. without removing and/or replacing parts of the same, as in known solutions.

From the above, it is clear that the reconfiguration of the forming section described for the change from a section with four-cavity moulds to a section with three-cavity moulds is applied for any reconfiguration that requires a change in the number of cavities, for example the change from three cavities to two cavities or from three cavities to one cavity.

From the above, finally, it appears clear that the way in which the arms 21 are made could be different to what was described above, though always according to the principle of making at least one portion of the arms selectable among other available portions, with different lengths and/or shapes, so as to make the arm configurable. In particular, the attachment end elements 23 could be connected to the corresponding curved portions 19 by using joints or rapid couplings.

Figure 9:
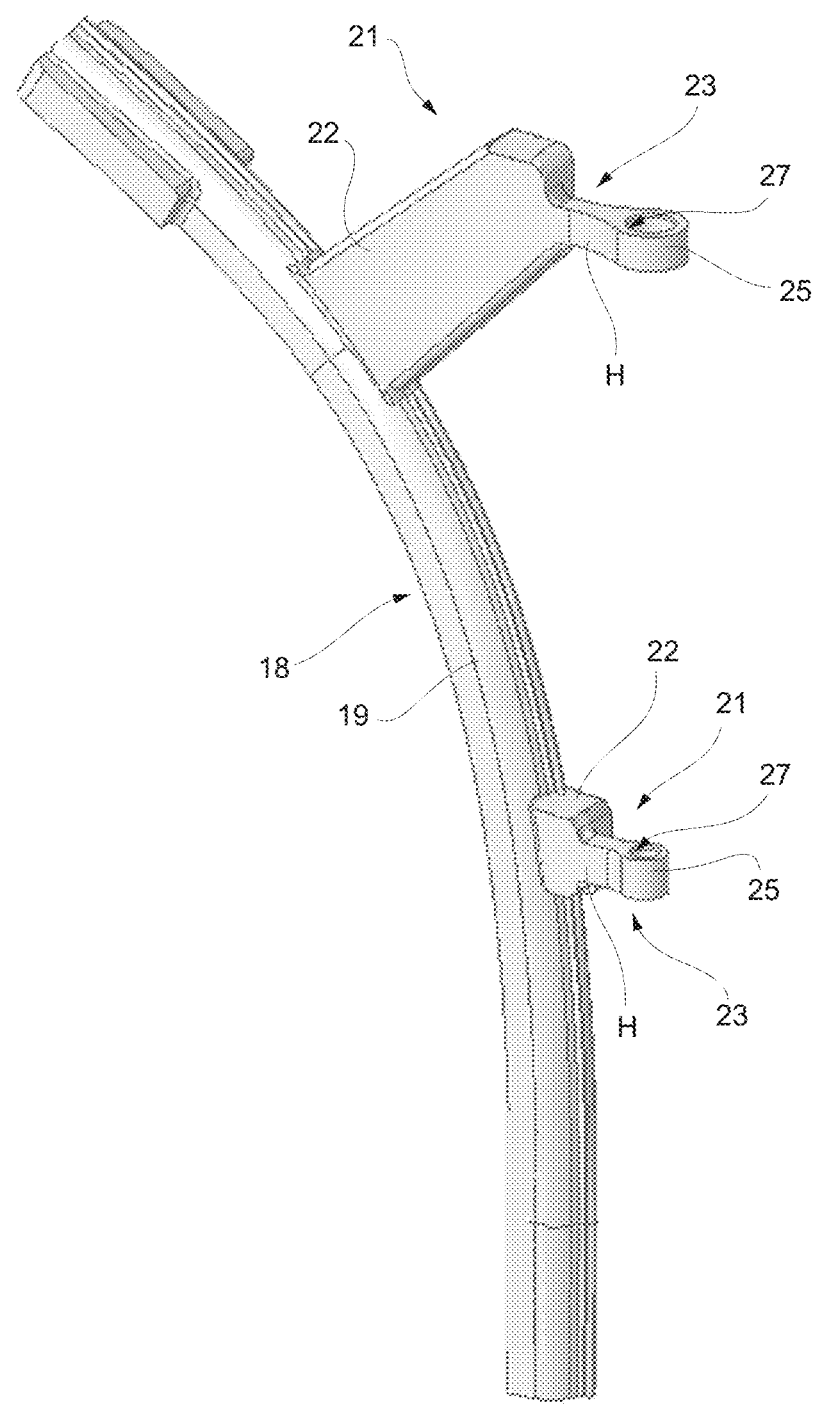
FIGS. 9 and 10 illustrate a variant of a detail in FIG. 3 and, respectively, in FIG. 7.
Figure 10:
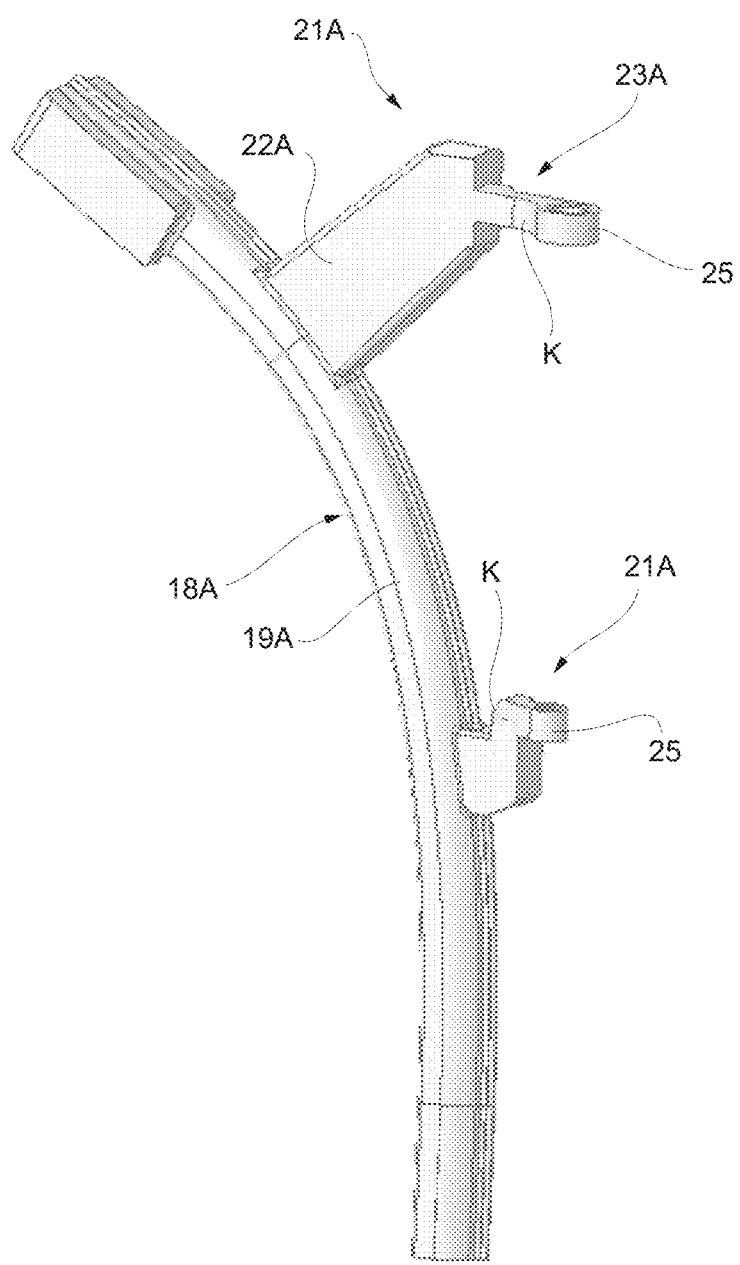

From the above, then, it appears clear that the arms 21 can also consist of one piece, as illustrated in FIGS. 9 and 10, enabling production changes in rapid times but, above all, without the need to modify the structure 10, which always remains built for the maximum number of cavities that could be used on the section 1, and on which at least one pair of pins 12 remains unused when the number of actually used cavities is less than the above-mentioned maximum number of cavities.

In fact, like the arms 12 illustrated in FIGS. 3 and 7, the arms illustrated in FIGS. 9 and 10 also comprise corresponding adaptation portions H and K configured like the stem 26 and, respectively, like the stem 26A, again to allow the change from the maximum number of cavities to a lower number of cavities (and vice versa).

What is claimed is:

1. A glass article forming section comprising:
   a frame;
   a forming mould having one or more cavities, wherein each of the one or more cavities is suitable to accommodate a respective glass gob;
   a configurable gob guiding unit comprising a plurality of deflectors and a support structure connected to the frame,
   wherein the support structure has a plurality of attachments for the deflectors,
   wherein the number of attachments is equal to a maximum number of cavities that can be used in the glass article forming section regardless of the actual number of cavities that are mounted in the glass article forming section during use,
   wherein each deflector comprises a curved portion defining a curved channel for guiding a respective glass gob into the one or more cavities and two arms extending in a cantilevered manner from the curved portion,
   wherein each of the two arms of each deflector comprises an end element having a respective attachment portion and an adaptation portion-configured based on a position of a corresponding one of the one or more cavities to allow coupling of the respective attachment portion to the support structure via a corresponding one of the attachments,
   wherein the end elements are replaceable end elements detachable from the curved portions of the deflectors,
   wherein the configurable gob guiding unit further comprises additional end elements,
   wherein the additional end elements are available to replace the replaceable end elements and each have corresponding adaptation portions different from the adaptation portions of the replaceable end elements to adapt to a different cavity position, and
   wherein the configurable gob guiding unit has at least one functional configuration in which: the actual number of cavities mounted in the glass article forming section is less than the maximum number of cavities, at least one of the replaceable end elements is replaced by one of the additional end elements, at least one of the attachments is unused, and at least one of the deflectors is uncoupled from the support structure.

2. The glass article forming section according to claim 1, wherein each of the two arms of each deflector comprises:
   a releasable connection interposed between the curved portion and the replaceable end element;
   wherein the adaptation portion of the replaceable end element is configured based on a number of cavities of the forming mould or the position of the corresponding one of the cavities in the forming mould.

3. The glass article forming section according to claim 1, wherein each of the two arms of each deflector comprises:
   a bracket fixedly connected to the curved portion; and
   a releasable connection interposed between the bracket and the replaceable end element to allow disassembly of the replaceable end element from the bracket.

4. The glass article forming section according to claim 3, wherein the releasable connection comprises clamping screws.

5. The glass article forming section according to claim 3, wherein the replaceable attachment end element of each deflector comprises:
   a base that releasably joins to the bracket by the releasable connection; and
   a stem connecting the base to the respective attachment portion, the stem defining the adaptation portion.

6. The glass article forming section according to claim 5, wherein the replaceable end element of each deflector is interchangeable with at least one of the additional end elements, having the same base, the same attachment portion, and a further stem that is geometrically and/or dimensionally different from the stem of the replaceable end element.

7. The glass article forming section according to claim 1, wherein each attachment comprises a pin for each of the two arms.

8. The glass article forming section according to claim 7, wherein each pin has a position that remains unchanged when the configurable gob guiding unit is in different functional configurations.

9. A glass article forming section comprising:
a frame;
a forming mould having one or more cavities, each of the one or more cavities suitable to accommodate a respective glass gob;
a configurable gob guiding unit comprising a plurality of deflectors and a support structure connected to the frame,
wherein the support structure has a plurality of attachments for the deflectors,
wherein the number of the attachments is equal to a maximum number of cavities that can be used in the glass article forming section regardless of the actual number of cavities that are mounted in the glass article forming section during use,
wherein each deflector comprises a curved portion defining a curved channel for guiding the respective glass gob into the one or more cavities and two arms extending in a cantilevered manner from the curved portion,
wherein each of the two arms of each deflector comprises a respective attachment portion and an adaptation portion configured based on a position of a corresponding one of the cavities to allow coupling of the respective attachment portion to the support structure via a corresponding one of the attachments,
wherein the deflectors are replaceable deflectors;
wherein the configurable gob guiding unit further comprises additional deflectors,
wherein the additional deflectors are available to replace the replaceable deflectors and have corresponding adaptation portions different from the adaptation portions of the replaceable deflectors to adapt to a different cavity position, and
wherein the configurable gob guiding unit has at least one functional configuration in which: the actual number of cavities mounted in the glass article forming section is lower than the maximum number of cavities, at least one of the additional deflectors replaces a corresponding one of the replaceable deflectors on the support structure, at least one of the attachments is unused, and at least another one of the replaceable deflectors is uncoupled from the support structure.

* * * * *